(No Model.)

W. HESTON.
JAR FASTENER.

No. 377,676.        Patented Feb. 7, 1888.

WITNESSES:
Harry P. Reed
Chas. F. Miller

INVENTOR
William Heston
BY
W. K. Miller
ATTORNEY

UNITED STATES PATENT OFFICE.

WILLIAM HESTON, OF MOUNT UNION, OHIO.

JAR-FASTENER.

SPECIFICATION forming part of Letters Patent No. 377,676, dated February 7, 1888.

Application filed October 27, 1887. Serial No. 253,513. (No model.)

*To all whom it may concern:*

Be it known that I, WILLIAM HESTON, a citizen of the United States, and a resident of Mount Union, county of Stark, State of Ohio, have invented a new and useful Improvement in Jar-Fasteners, of which the following is a full, clear, and exact description, reference being had to the accompanying drawings, making part of this specification.

My invention relates to improvements in fastenings for fruit-jars; and it consists of certain features of construction and combination of parts, as will be hereinafter described, and set forth in the claims.

Figure 1:
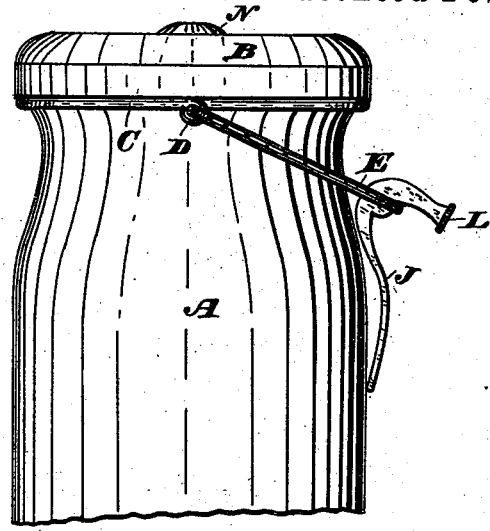
Figures 2, 3:
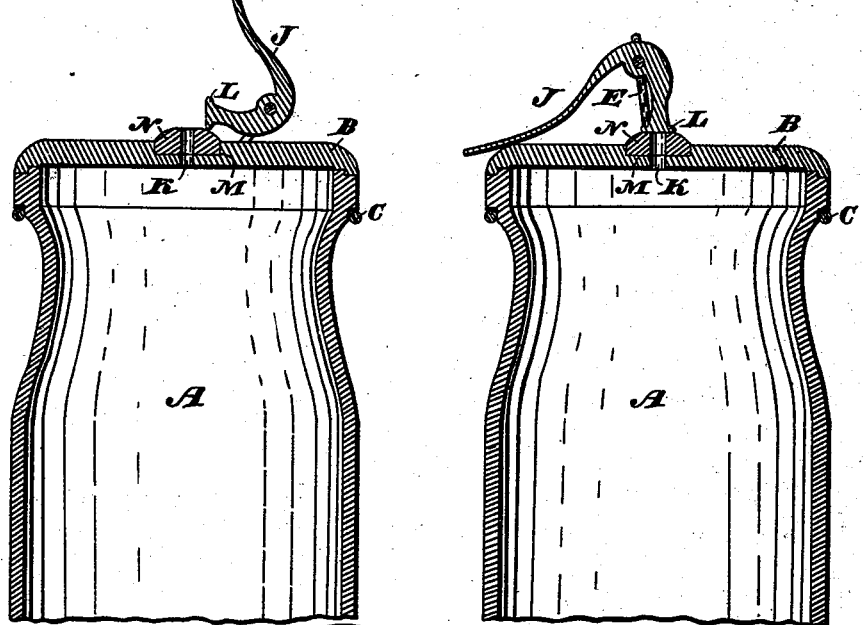
Figure 4:
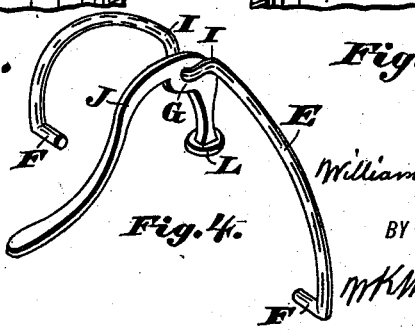

Figure 1 is a side elevation of a fruit-jar, illustrating my invention. Fig. 2 is a vertical sectional view showing the parts in position for fastening. Fig. 3 is a vertical sectional view showing the parts in fastened position. Fig. 4 is an isometrical view of the spring-bail and valve-lever.

Similar letters of reference indicate corresponding parts in all of the figures of the accompanying drawings.

As my invention relates to sealing and fastening the lids, and is applicable to cans and jars now in use, I will proceed to describe my invention, referring to the jar only as conjunctional thereto.

Letter A represents the jar; B, the lid. A wire band, C, is placed about the neck of the jar, as shown, having eyes D formed therein diametrically opposite each other, or substantially so. The wire bail E has its ends bent transversely, forming pivots, as F, that rest in the eyes D. To give to the bail E some elasticity, there is provided at its apex a depression, G, forming two crowning-points, I I, between which the hand-lever J is loosely secured, said bail forming a fulcrum over which the lever J is operated. On the short end of the said lever there is provided a valve or foot, L. Through the said lid B, and central thereto, or thereabout, is provided a small perforation, as K, and on the upper side of said lid and about the perforation there is provided a counterbore or socket, M, of such diameter and depth as may be preferred; and in said socket is placed a rubber valve-seat, N, having a central perforation that coincides with the perforation K in the lid B, thus forming a small opening to the inside of the jar through the lid.

The operation is as follows: To close the jar, place the lid on with rubber gasket in the usual way; then pass the bail and lever over the lid to position shown in Fig. 2, the edge of the valve L resting on the rubber valve-seat N; then swing the lever over to position as shown in Fig. 3, the valve or foot L resting over and closing the perforation through the valve and lid, the spring of the bail holding the parts firmly in position, as shown in Fig. 3. To open the jar the lever and bail are thrown back into position as shown in Fig. 1. The air will then pass through the opening in the lid into the jar, equalizing the pressure, after which the lid may be easily removed.

Another advantage over other fastenings is that the jars may be filled, the lids placed on, and the jars and contents heated to the desired degree. The lever, standing as shown in Fig. 2, is then turned over to position shown in Fig. 3; or the contents of the jar may be reheated by placing the jars in the hot bath, turning off the valves L to allow the heated air to escape, and when sufficiently heated resealed by throwing the lever into the sealing and fastening position.

Having thus fully described the nature and operation of my invention, what I claim, and desire to secure by Letters Patent, is—

1. The combination, with a jar, of the lid B, having a central perforation, as K, counterbore M, valve-seat N, valve L, lever J, and spring-bail E, substantially as described, and for the purpose set forth.

2. The combination, with the jar and the jar-lid provided with a central perforation and a valve-seat surrounding said perforation, of a spring-bail secured to the neck of the jar, a lever pivoted to the bail at its middle portion, and a valve secured to the short arm of the lever and adapted to rest snugly in contact with the said valve-seat when the lever is swung to close the jar, substantially as set forth.

In testimony whereof I have hereunto set my hand this 22d day of October, A. D. 1887.

WILLIAM HESTON.

Witnesses:
CHAS. R. MILLER,
W. K. MILLER.